US012613641B2

(12) United States Patent
Chen et al.

(10) Patent No.: US 12,613,641 B2
(45) Date of Patent: Apr. 28, 2026

(54) SOLID-STATE DISK BLOCK CORRECTION METHOD AND APPARATUS, AND ELECTRONIC DEVICE AND STORAGE MEDIUM

(71) Applicant: SUZHOU METABRAIN INTELLIGENT TECHNOLOGY CO., LTD., Suzhou (CN)

(72) Inventors: Qinglu Chen, Suzhou (CN); Baolin Zhao, Suzhou (CN); Wenzheng Qin, Suzhou (CN)

(73) Assignee: SUZHOU METABRAIN INTELLIGENT TECHNOLOGY CO., LTD., Suzhou (JP)

( * ) Notice: Subject to any disclaimer, the term of this patent is extended or adjusted under 35 U.S.C. 154(b) by 0 days.

(21) Appl. No.: 19/146,906

(22) PCT Filed: Sep. 27, 2023

(86) PCT No.: PCT/CN2023/122284
§ 371 (c)(1),
(2) Date: Jul. 9, 2025

(87) PCT Pub. No.: WO2024/148875
PCT Pub. Date: Jul. 18, 2024

(65) Prior Publication Data
US 2026/0111122 A1     Apr. 23, 2026

(30) Foreign Application Priority Data
Jan. 10, 2023   (CN) .......................... 202310036361.0

(51) Int. Cl.
*G06F 3/06*          (2006.01)

(52) U.S. Cl.
CPC .......... *G06F 3/0619* (2013.01); *G06F 3/0632* (2013.01); *G06F 3/0679* (2013.01)

(58) Field of Classification Search
None
See application file for complete search history.

(56) References Cited

U.S. PATENT DOCUMENTS 9,934,156 B1 *   4/2018   Zhang ................. G06F 12/0292
2016/0266795 A1   9/2016   Woo et al.
(Continued)

FOREIGN PATENT DOCUMENTS

CN          108255630 A      7/2018
CN          108664218 A     10/2018
(Continued)

*Primary Examiner* — Charles J Choi
(74) *Attorney, Agent, or Firm* — IPro, PLLC

(57) ABSTRACT

Embodiments of the present application provide a method and apparatus for correcting a block of a solid-state drive, an electronic device, and a storage medium. The method includes: after powering up the SSD, obtaining a first physical address in a latest mapping relationship recorded by a super block of a double data rate (DDR); querying a second physical address corresponding to an open block in a single layer cell (SLC) block info table of the DDR; and replacing the second physical address of the open block in the SLC block info table with the first physical address. The open block in the SLC block info table is corrected; correctness of the open block in the SLC block info table of the DDR after the SSD is powered up is ensured; and stability of operation of an SSD system is improved.

20 Claims, 9 Drawing Sheets

After powering up a solid state disk, obtaining a first physical block address in a last mapping relationship recorded by a super block of a DDR — 101

Querying a second physical block address corresponding to an open block in an SLC block info table of the DDR — 102

Replacing the second physical block address corresponding to the open block in the SLC block info table with the first physical block address — 103

(56) References Cited

U.S. PATENT DOCUMENTS

| | | |
|---|---|---|
| 2016/0306552 A1 | 10/2016 | Liu et al. |
| 2020/0064897 A1 | 2/2020 | Nomura |

FOREIGN PATENT DOCUMENTS

| | | |
|---|---|---|
| CN | 108762989 A | 11/2018 |
| CN | 109213690 A | 1/2019 |
| CN | 109753241 A | 5/2019 |
| CN | 110673789 A | 1/2020 |
| CN | 111723411 A | 9/2020 |
| CN | 113253943 A | 8/2021 |
| CN | 115729478 A | 3/2023 |

* cited by examiner

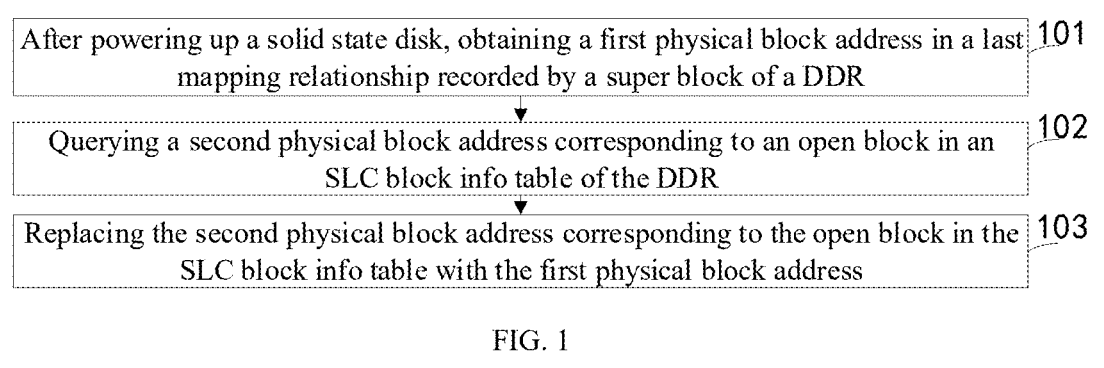

| | |
|---|---|
| After powering up a solid state disk, obtaining a first physical block address in a last mapping relationship recorded by a super block of a DDR | 101 |
| Querying a second physical block address corresponding to an open block in an SLC block info table of the DDR | 102 |
| Replacing the second physical block address corresponding to the open block in the SLC block info table with the first physical block address | 103 |

FIG. 1

Slc block info table

Slc page size

Sequence number

Slc block info format

: Slc block info corresponding to a single SLC

Recording attribute information of the page during flashing into an NAND at an Slc page size

```
typedef union pca_format {
    struct {
        page: bit_num1;
        block: bit_num2;
        lun: bit_num3;
        target: bit_num4;
        channel: bit_num5;
    };
    uint32_t pca_value;
} pca_t;
```

FIG. 3

Reconstructed SLC open block

Reconstructed SLC open block          Actual SLC open block

901

SOLID-STATE DISK BLOCK CORRECTION METHOD AND APPARATUS, AND ELECTRONIC DEVICE AND STORAGE MEDIUM

CROSS-REFERENCE TO RELATED APPLICATION

This application claims the priority of the Chinese Patent application No. 202310036361.0, filed on Jan. 10, 2023 with the China National Intellectual Property Administration, titled "SOLID-STATE DISK BLOCK CORRECTION METHOD AND APPARATUS, AND ELECTRONIC DEVICE AND STORAGE MEDIUM", which is incorporated herein in its entirety by reference.

FIELD

The present application relates to the technical field of storage, and in particular, to a method for correcting a solid-state drive block, an apparatus for correcting a block of a solid-state drive, an electronic device, and a non-transitory computer readable storage medium.

BACKGROUND

Metadata, also referred to as the system management data of an SSD (Solid-state Disk or Solid-State Drive), includes a flash translation layer (FTL) mapping table, a trim table, and the like. During operation of an SSD, the metadata is stored in an SSD double data rate (DDR) memory. Before the SSD is completely powered down, the metadata needs to be written from the DDR to a NAND flash memory (NAND) for solidification. In a process of powering up the SSD again, the metadata needs to be read from the NAND and restored to a corresponding region in the SSD's DDR. For a single layer cell (SLC) NAND, a block used in an SLC way is referred to as an SLC block. For a triple layer cell (TLC) NAND, a block used in a TLC way is referred to as a TLC block. Considering the importance of the SSD metadata and a characteristic that an SLC block is much more stable than a TLC block, an SSD product usually employs SLC blocks to store metadata and manage all the SLC blocks that store the metadata through SLC block information (SLC block info).

As important metadata, the SLC block info also needs to be completely written into the SLC blocks for saving in a process of powering down the SSD. In this way, after the SLC block info is restored from the SLC blocks to the SSD's DDR in the power-up process, the SSD may sequentially traverse the SLC block info of the SLC block to reconstruct an SLC block management structure (A structure-type data structure used to manage the usage of an entire block, including opening, writing, closing, erasing, and recycling operations.), including establishing an SLC open block that stores the SLC block info, and the like.

However, in the power-down process, saving the entire SLC block info to the SLC blocks also consumes a free page of an SLC open block. This causes a change in the SLC block info corresponding to the SLC open block, so that an SLC open block before the SSD is powered down is inconsistent with the SLC open block reconstructed based on the SLC block info in the power-up process. Consequently, if new data is continued to be written into the SLC open block, an open block overwriting issue occurs.

SUMMARY

The present application provides a method and apparatus for correcting a block of a solid-state drive, an electronic device, and a non-transitory computer readable storage medium, to solve the following problem: since an SLC open block before an SSD is powered down is inconsistent with an SLC open block reconstructed based on SLC block info in a power-up process, if new data is continued to be written into the SLC open block, an open block overwriting issue occurs.

An embodiment of the present application discloses a method for correcting a solid-state drive block, including:

after powering up the solid-state drive, obtaining a first physical address in a latest mapping relationship recorded by a super block of a double data rate (DDR);

querying a second physical address of an open block in a single layer cell (SLC) block info table of the DDR; and replacing the second physical address of the open block in the SLC block info table with the first physical address.

In some embodiments, the first physical address comprises first page usage information of a first block corresponding to the first physical address, the second physical address comprises second page usage information of a second block corresponding to the second physical address, and the step of replacing the second physical address corresponding to the open block in the SLC block info table with the first physical address comprises:

determining whether the first block corresponding to the first physical address and the second block corresponding to the second physical address are identical; and in response to the first block corresponding to the first physical address and the second block corresponding to the second physical address being identical, replacing the second page usage information with the first page usage information.

In some embodiments, in response to that the first block corresponding to the first physical address and the second block corresponding to the second physical address being identical represents that no new free block is used when the SLC block info table is saved from the DDR to a block of a non-volatile memory express (NAND) flash memory in a powering off process of the SSD.

In some embodiments, after the step of determining whether the first block corresponding to the first physical address and the second block corresponding to the second physical address are identical, the method further comprises:

in response to that the block corresponding to the first physical address and the block corresponding to the second physical address being different, replacing the second physical address corresponding to the open block in the SLC block info table with the first physical address.

In some embodiments, when the first block corresponding to the first physical address and the second block corresponding to the second physical address are different, in a process of powering down the SSD, a new free block is used when the SLC block info table is saved from the DDR to a block of a NAND.

In some embodiments, after the step of determining that the first block corresponding to the first physical address and the second block corresponding to the second physical address are different, the method further comprises:

changing an occupancy state of the second block corresponding to the second physical address from a free state to an occupied state.

In some embodiments, after the step of determining that the first block corresponding to the first physical address and the second block corresponding to the second physical address are different, the method further comprises:

changing a block type of the second block corresponding to the second physical address from a free block type to an SLC block info type.

In some embodiments, wherein the step of determining whether the first block corresponding to the first physical address and the second block corresponding to the second physical address are identical comprises:

clearing the first page of the first physical address and the second page of the second physical address;

determining whether the first physical address with a cleared page and the second physical address with a cleared page are consistent;

in determining that the first physical address with the cleared page and the second physical address with the cleared page are consistent, determining that the first block corresponding to the first physical address and the second block corresponding to the second physical address are identical; and in determining that the first physical address with the cleared page and the second physical address with the cleared page are inconsistent, determining that the first block corresponding to the first physical address and the second block corresponding to the second physical address are different.

In some embodiments, further comprising:

in a process of powering down the SSD, saving metadata stored in the DDR into a block of a NAND, wherein the metadata at least comprises a flash translation layer (FTL) mapping table, a trim table, a TLC block info table, a first table, a second table, and an SLC block info table.

In some embodiments, wherein the step of saving metadata stored in the DDR into a block of a NAND comprises:

saving the metadata into the block of the NAND based on a sequence of the FTL mapping table, the trim table, the TLC block info table, the first table, the second table, and the SLC block info table.

In some embodiments, further comprising:

in the process of powering down the SSD, during the saving the SLC block info table from the DDR into the block of the NAND, recording a mapping relationship generated by saving the SLC block info table into the block of the NAND through the super block in the DDR.

In some embodiments, after the step of saving the SLC block info table from the DDR into the block of the NAND, the method further comprises:

saving data information recorded in the super block of the DDR into the block of the NAND.

In some embodiments, wherein the step of saving data information recorded in the super block of the DDR into the block of the NAND comprises:

saving, by a control manager, data information recorded in the super block of the DDR into the block of the NAND.

In some embodiments, further comprising:

in a process of powering up the SSD, restoring the data information stored in the block of the NAND and the SLC block info table into the DDR.

In some embodiments, wherein the SLC block info table records a timestamp at which a block of a NAND is changed from a free block to an open block, and the step of querying a second physical address corresponding to an open block in an SLC block info table of the DDR comprises:

determining a block corresponding to a latest timestamp in the SLC block info table as the open block; and querying the second physical address corresponding to the open block.

In some embodiments, wherein the SLC block info table is used for recording a block type of a block of a NAND, an occupancy state of the block of the NAND, and physical address information comprising a page usage state of the block of the NAND.

In some embodiments, wherein after the step of replacing the second physical address corresponding to the open block in the SLC block info table with the first physical address, the method further comprises:

obtaining a block type corresponding to a block in the SLC block info table; and setting a management structure of the block based on the block type corresponding to the block.

An embodiment of the present application further provides an apparatus for correcting a block of a SSD, the apparatus comprises:

an address obtaining module, configured to: after powering up the SSD, obtain a first physical address in a latest mapping relationship recorded by a super block of a DDR;

an address querying module, configured to query a second physical address of an open block in an SL block info table of the DDR; and an address replacement module, configured to: replace the second physical address of the open block in the SLC block info table with the first physical address.

In some embodiments of the present application, the first physical address comprises first page usage information of a first block corresponding to the first physical address, the second physical address comprises second page usage information of a second block corresponding to the second physical address. An address replacement module includes:

a block determining submodule, configured to determine whether the first block corresponding to the first physical address and the second block corresponding to the second physical address are identical; and a page usage information replacement submodule, configured to: in response to the first block corresponding to the first physical address and the second block corresponding to the second physical address being identical, replacing the second page usage information with the first page usage information.

In some embodiments, wherein in response to that the first block corresponding to the first physical address and the second block corresponding to the second physical address being identical represents that no new free block is used when the SLC block info table is saved from the DDR to a block of a non-volatile memory express (NAND) flash memory in a powering off process of the SSD.

In some embodiments of the present application, the apparatus further includes:

an address replacement submodule, configured to: in response to that the block corresponding to the first physical address and the block corresponding to the second physical address being different, replacing the second physical address corresponding to the open block in the SLC block info table with the first physical address.

In some embodiments of the present application, when the first block corresponding to the first physical address and the second block corresponding to the second physical address are different, in a process of powering down the SSD, a new free block is used when the SLC block info table is saved from the DDR to a block of a NAND.

In some embodiments of the present application, the apparatus further includes:

a state change submodule, configured to change an occupancy state of the second block corresponding to the second physical address from a free state to an occupied state.

In some embodiments of the present application, the apparatus further includes: a type change submodule, configured to change a block type of the second block corresponding to the second physical address from a free block type to an SLC block info type.

In this embodiment of the present application, the block determining submodule includes:

a page clearing unit, configured to clear the first page of the first physical address and the second page of the second physical address;

an address comparison unit, configured to determine whether the first physical address with a cleared page and the second physical address with a cleared page are consistent; a first block determining unit, configured to: in determining that the first physical address with the cleared page and the second physical address with the cleared page are consistent, determining that the first block corresponding to the first physical address and the second block corresponding to the second physical address are identical; and a second block determining unit, configured to: in determining that the first physical address with the cleared page and the second physical address with the cleared page are inconsistent, determining that the first block corresponding to the first physical address and the second block corresponding to the second physical address are different.

In some embodiments of the present application, the apparatus further includes: a data saving module, configured to: in a process of powering down the SSD, saving metadata stored in the DDR into a block of a NAND, wherein the metadata at least comprises a flash translation layer (FTL) mapping table, a trim table, a TLC block info table, a first table, a second table, and an SLC block info table.

In some embodiments of the present application, the data saving module includes:

a first data saving submodule, configured to: save the metadata into the block of the NAND based on a sequence of the FTL mapping table, the trim table, the TLC block info table, the first table, the second table, and the SLC block info table.

In some embodiments of the present application, the apparatus further includes:

a mapping relationship recording module, configured to: in the process of powering down the SSD, during the saving the SLC block info table from the DDR into the block of the NAND, recording a mapping relationship generated by saving the SLC block info table into the block of the NAND through the super block in the DDR.

In some embodiments of the present application, the apparatus further includes:

a second data saving module, configured to save data information recorded in the super block of the DDR into the block of the NAND.

In some embodiments of the present application, the second data saving module includes:

a second data saving submodule, configured to save, by a control manager, data information recorded in the super block of the DDR into the block of the NAND.

The second data saving module further includes:

a data recovery module, configured to: in a process of powering up the SSD, restore the data information stored in the block of the NAND and the SLC block info table into the DDR.

In some embodiments of the present application, the SLC block info table records a timestamp at which a block of a NAND is changed from a free block to an open block, and the address querying module includes:

an open block determining submodule, configured to determine a block corresponding to a latest timestamp in the SLC block info table as the open block; and an address querying submodule, configured to query the second physical address corresponding to the open block.

In some embodiments of the present application, the SLC block info table is used for recording a block type of a block of a NAND, an occupancy state of the block of the NAND, and physical address information including a page usage state of the block of the NAND.

In some embodiments of the present application, the apparatus further includes:

a type obtaining module, configured to obtain a block type corresponding to a block in the SLC block info table; and a structure setting module, configured to set a management structure of the block based on the block type corresponding to the block.

An embodiment of the present application further provides an electronic device, comprising: a processor, a communication interface, a memory, and a communication bus, wherein the processor, the communication interface, and the memory communicate with each other through the communication bus;

the memory is configured to store a computer program; and the processor is configured to execute the computer program stored on the memory to implement the method according to any one of the above embodiments.

An embodiment of the present application further provides a non-transitory computer readable storage medium, having an instruction stored thereon, wherein the instruction, when executed by one or more processors, causes the processor to implement the method according to any one of the above embodiments.

The embodiments of the present application include the advantages as follows. In the embodiments, a mapping relationship generated by writing an SLC block info table into a NAND is stored into a super block of a non-metadata module DDR. After an SSD is powered up, a first physical address in a latest mapping relationship stored in the super block is used to replace a second physical address of an open block in the SLC block info table, thus the open block in the SLC block info table is corrected, which ensures correctness of the open block in the SLC block info table of the DDR after the SSD is powered up, improves stability of operation of an SSD system, and avoids the open block overwriting problem when new data continues to write into the SLC open block due to an SLC open block which stores the SLC block info table before the SSD is powered down being inconsistent with a reconstructed SLC open block based on SLC block info in a power-up process.

BRIEF DESCRIPTION OF THE DRAWINGS

FIG. 1 is a flowchart of steps of a method for correcting a block of a solid-state drive according to an embodiment of the present application;

FIG. 3 is a schematic diagram of a physical address (PCA) according to an embodiment of the present application;

DETAILED DESCRIPTION

Figure 2:
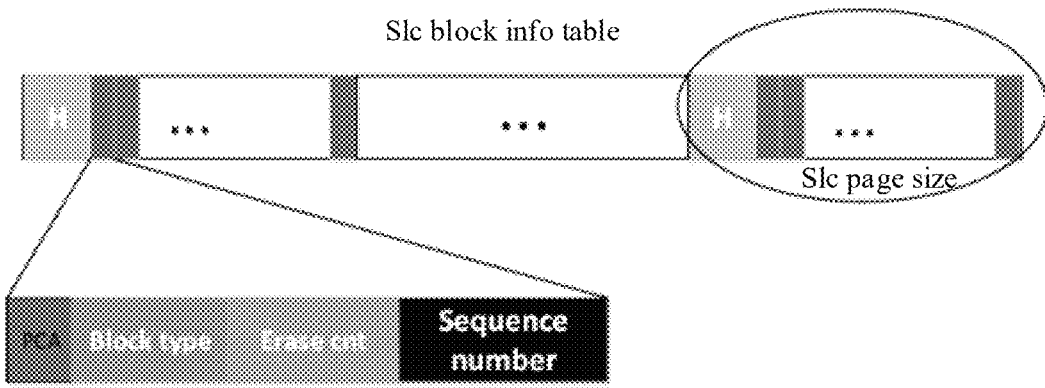
FIG. 2 is a schematic diagram of an SLC block info table according to an embodiment of the present application.

To make the above objectives, features, and advantages of the present application more comprehensible, the present application will be further described in detail below in combination with the accompanying drawings and specific implementations.

Definitions of related abbreviations and key terms:

SSD: Solid State drives

LBA: Logical Block Address

PCA: Physical Address

FTL: Flash Translation Layer

JM: Journal Manager

CM: Control Manager

SLC: Single Layer Cell

TLC: Triple Layer Cell

L2P: Logical To Physical Table, i.e., FTL mapping;

Info: information

DDR: Double Data Rate

NAND: NAND flash memory

A characteristic of a NAND requires that reading and writing are performed in units of page, while erasing is performed in units of block. A block encapsulates a plurality of pages. Writing of the pages has continuity, and skip writing of the pages is not allowed. In order to implement functions such as data writing, wear leveling, and garbage collection within an SSD, block resources need to be uniformly managed.

Generally, erased blocks are referred to as empty blocks or free blocks and may be written with new data at any time. When a free block is selected and used for being written with current data, the free block is converted into an open block. This state of the block may persist until the block is fully written. After the open block is fully written with data in units of page, the open block is converted into a used block. This block is also referred to as a target object of garbage collection.

Metadata, also referred to as an SSD system management data, includes an FTL mapping table, a trim table, and the like. During operation of an SSD, the metadata is stored in an SSD's DDR memory. Before the SSD is completely powered down, the metadata needs to be written from the DDR to a NAND for solidification. In a process of powering up the SSD again, the metadata needs to be read from the NAND and restored to a corresponding region in the SSD's DDR. For a TLC NAND, a block used in an SLC manner is referred to as an SLC block, and a block used in a TLC manner is referred to as a TLC block.

Considering importance of SSD metadata and a characteristic that an SLC block is much more stable than a TLC block, SSD products typically employ SLC blocks to store metadata and manage, through SLC block info, all the SLC blocks that store metadata. The SLC block info records a type of each SLC block (a free block type, a bad block type (a non-functional or unreliable storage unit within a storage device), various metadata occupied block types (such as an SLC block type that stores an FTL mapping table)), and PCA information including a current page usage state. As important metadata, the SLC block info also needs to be completely written into the SLC blocks for saving in a process of powering down the SSD. In this way, after the SLC block info is restored from the SLC blocks to the SSD's DDR in the power-up process, the SSD may sequentially traverse the SLC block info of each SLC to reconstruct an SLC block management structure, including establishing an SLC open block that stores the SLC block info, and the like.

However, there is a major issue that storing the entire SLC block info into the SLC blocks in the power-down process also consumes free pages of an SLC open block. This causes changes in the SLC block info corresponding to the SLC open block. That is, the SLC block info written in the power-down process does not account for a change in the SLC block info caused by flashing the SLC block info. In this way, this may cause inconsistency between actual page usage information of the SLC open block before the SSD is powered down and page usage information in an SLC open block reconstructed based on the SLC block info in the power-on process. If new data is continued to be written into the SLC open block, a page overwriting issue will occur. If the SLC block info reads an overwritten page during subsequent power-up recovery, a read uncorrectable bit error (UNC) problem may occur, resulting in a recovery failure and ultimately causing the SSD to be inoperable. Simply, all the SLC block info again may be saved in the power-down process. However, this may cause a change in the SLC block info, ultimately leading to a dead loop of saving of the SLC block info.

Based on this, for the particularity that saving SLC block info, a type of metadata to an SLC block in a power-down process of an SSD may cause the metadata itself to change again, present application provides a method and an apparatus for correcting a block of a solid-state drive, an electronic device, and a storage medium. This effectively solves the problem of open block overwriting and ensures stability of an SSD system.

FIG. 1 is a flowchart of steps of a method for correcting a block of a solid-state drive according to an embodiment of the present application. The steps of the method for correcting the block of the solid-state drive include:

Step 101: after powering up the solid-state drive, obtaining a first physical address in a latest mapping relationship recorded by a super block of a DDR.

The first physical address is a physical address of an open block after an SLC block info table is written into a block of a NAND. The first physical address includes first page usage information of the open block.

A block is in a free state when not in use, and this block is a free block. A block is in an occupied state during or after data writing, and this block is an open block. After an open block is fully written with data in units of page, the open block is converted into a used block.

All SLC blocks that store metadata are managed based on the SLC block info table. The SLC block info table is also metadata, and data recorded in the super block of the DDR is not metadata.

In a process of powering down the solid-state drive, the SLC block info table in the DDR and data information recorded in the super block of the DDR may be sequentially written into the block of the NAND. The data information recorded in the super block includes a mapping relationship in JM L2P (Journal manager logical to physical table) generated by saving (writing) the SLC block info table into the block of the NAND.

In the process of powering up the SSD, the SLC block info table stored in the block of the NAND and the data information recorded in the super block may be restored into the super block of the DDR.

Therefore, the mapping relationship JM L2P generated by saving the SLC block info table into the block of the NAND may be obtained from the data information recorded in the super block of the DDR, namely, a latest mapping relationship recorded in the super block, thus obtaining the first physical address of the mapping relationship JM L2P.

Step 102: querying a second physical address of an open block in an SLC block info table of the DDR.

The second physical address is a physical address of an open block after other metadata (other than the SLC block info table) is written into the block of the NAND. The second physical address includes second page usage information of the open block.

In some embodiments, in the process of powering up the SSD, the SLC block info table stored in the block of the NAND may be restored into the DDR, so the second physical address of the open block recorded in the SLC block info table may be queried from the DDR.

Step 103: replacing the second physical address of the open block in the SLC block info table with the first physical address.

Data information recorded in the SLC block info table does not include the mapping relationship JM L2P generated by writing the SLC block info table itself into the block of the NAND. That is, the open block recorded in the SLC block info table may change a page usage state in the open block due to the SLC block info table being written into the NAND, or cause the open block to be converted into a used block after being fully written with data in units of page and then to continue to be written into a new free block.

The latest mapping relationship JM L2P recorded in the super block of the DDR is the mapping relationship JM L2P generated by writing the SLC block info table into the block of a NAND. Therefore, the first physical address is a physical address of an open block that stores metadata.

Therefore, the second physical address of the open block in the SLC block info table is replaced with the first physical address, to correct the open block in the SLC block info table.

It should be noted that the data recorded in the super block of the DDR is not metadata, so even if the data information of the super block is written into the NAND, namely, even if a page usage state of the open block that stores the metadata is changed, the open block that stores the metadata will not be changed.

In the embodiments of the present application, a mapping relationship generated by writing an SLC block info table into a NAND is stored into a super block of a non-metadata module DDR. After an SSD is powered up, a first physical address in a latest mapping relationship stored in the super block is used to replace a second physical address of an open block in the SLC block info table, thus correcting the open block in the SLC block info table, ensuring correctness of the open block in the SLC block info table of the DDR after the SSD is powered up, improving stability of operation of an SSD system, and avoiding the following problem: since an SLC open block before the SSD is powered down is inconsistent with an SLC open block reconstructed based on SLC block info in a power-up process, if new data is continued to be written into the SLC open block, an open block overwriting issue occurs.

On the basis of the above embodiment, a transformed embodiment of the above embodiment is provided. It should be noted that in order to make a brief description, only differences from the above embodiment are described in the transformed embodiment.

In some embodiments of the present application, the first physical address comprises first page usage information of a first block corresponding to the first physical address, the second physical address comprises second page usage information of a second block corresponding to the second physical address, and the step of replacing the second physical address of the open block in the SLC block info table with the first physical address comprises: determining whether the first block corresponding to the first physical address and the second block corresponding to the second physical address are identical; and when the block corresponding to the first physical address and the block corresponding to the second physical address are identical, in response to the first block corresponding to the first physical address and the second block corresponding to the second physical address being identical, replacing the second page usage information with the first page usage information.

There are two situations in which an SLC open block before the SSD is powered down is inconsistent with an SLC open block reconstructed based on SLC block info in a power-on process. In one situation, the SLC open block before the SSD is powered down is consistent with the SLC open block reconstructed based on the SLC block info in the power-on process, but the page usage information in the open blocks is inconsistent. In the other situation, the SLC open block before the SSD is power down is inconsistent with the SLC open block reconstructed based on the SLC block info in the power-on process, and the page usage information in the open blocks may also be inconsistent. Therefore, whether the first block corresponding to the first physical address and the second block corresponding to the second physical address are identical needs to be determined. In response to that the first block corresponding to the first physical address and the second block corresponding to the second physical address being identical represents that an original open block is not fully written, no new free block is used when the SLC block info table is saved from the DDR to a block of a (NAND) in a powering off process of the SSD. However, the page usage information of the SLC open block before the SSD is powered down is inconsistent with the page usage information of the SLC open block reconstructed based on the SLC block info in the power-on process.

Therefore, directly replacing the second page usage information in the second physical address with the first page usage information in the first physical address may correct page usage information of the open block in the SLC block info table, thereby ensuring accuracy of the open block in the SLC block info table of the DDR after the SSD is powered up and enhancing stability of operation of an SSD system.

In some embodiments of the present application, after the step of determining whether the first block corresponding to the first physical address and the second block corresponding to the second physical address are identical, the method further comprises: in response to that the block corresponding to the first physical address and the block corresponding to the second physical address being different, replacing the second physical address corresponding to the open block in the SLC block info table with the first physical address.

In some embodiments, when the first block corresponding to the first physical address and the second block corresponding to the second physical address are different, it indicates that in the process of powering down the solid-state drive, when the SLC block info table is saved from the DDR into a block of a NAND, the pages of an original open block are fully written, and a new free block is selected as an open block to continue writing data. Therefore, the SLC open block before the SSD is powered down is inconsistent with the SLC open block reconstructed based on the SLC block info in the power-on process. Therefore, the second physical address corresponding to the open block in the SLC block info table is replaced with the first physical address.

In some embodiments of the present application, when the first block corresponding to the first physical address and the second block corresponding to the second physical address are different, the method further includes: changing an occupancy state of the second block corresponding to the second physical address from a free state to an occupied state.

In some embodiments, in order to avoid a risk of repeated writing caused by an actual open block being applied for as an open block by another metadata saving process, the occupancy state of the block corresponding to the second physical address needs to be changed from the free state into the occupied state, to prevent the open block from being applied for as a free block again.

In some embodiments of the present application, after the step of determining that the first block corresponding to the first physical address and the second block corresponding to the second physical address are different, the method further comprises: changing a block type of the second block corresponding to the second physical address from a free block type to an SLC block info type.

In some embodiments, when the first block corresponding to the first physical address and the second block corresponding to the second physical address are different, the type of the second block corresponding to the second physical address needs to be changed. In some embodiments, the second block type of the block needs to be changed from the free block type to the SLC block info type (The term "SLC block info type" refers to an SLC block that has already been written with the SLC block info.).

In some embodiments of the present application, the step of determining whether the first block corresponding to the first physical address and the second block corresponding to the second physical address are identical, comprises: clearing the first page of the first physical address and the second page of the second physical address; determining whether the first physical address with a cleared page and the second physical address with a cleared page are consistent; in determining that the first physical address with the cleared page and the second physical address with the cleared page are consistent, determining that the first block corresponding to the first physical address and the second block corresponding to the second physical address are identical; and in determining that the first physical address with the cleared page and the second physical address with the cleared page are inconsistent, determining that the first block corresponding to the first physical address and the second block corresponding to the second physical address are different.

In some embodiments, the first page of the first physical address and the second page of the second physical address are cleared. In this case, the first physical address and the second physical address may be regarded as physical addresses of the blocks, and do not include usage situations of the blocks. Therefore, by determining whether the first physical address with the cleared page and the second physical address with the cleared page are consistent, whether the first block corresponding to the first physical address and the second block corresponding to the second physical address are identical.

When the first physical address with the cleared page and the second physical address with the cleared page are consistent, it indicates that the first physical address and the second physical address correspond to the same block. Therefore, it is determined that the first block corresponding to the first physical address and the second block corresponding to the second physical address are identical.

When the first physical address with the cleared page and the second physical address with the cleared page are inconsistent, it indicates that the first physical address and the second physical address correspond to different blocks. Therefore, it is determined that the first block corresponding to the first physical address and the second block corresponding to the second physical address are different.

In some embodiments of the present application, the method further includes: in a process of powering down the SSD, saving metadata stored in the DDR into a block of a NAND, wherein the metadata at least includes an FTL mapping table, a trim table, a TLC block info table, a first table, a second table, and an SLC block info table.

In some embodiments, the metadata includes the FTL mapping table, the trim table, the TLC block info table, the first table, the second table, the SLC block info table, and the like. In the process of powdering down the SSD, the metadata stored in the DDR needs to be saved into the block of the NAND to prevent loss of the metadata stored in the DDR after the SSD is powered down.

In some embodiments of the present application, the step of saving metadata stored in the DDR to a block of a NAND comprises: saving the metadata into the block of the NAND based on a sequence of the FTL mapping table, the trim table, the TLC block info table, the first table, the second table, and the SLC block info table.

In some embodiments, in the process of saving the metadata stored in the DDR into the block of the NAND, the FTL mapping table, the trim table, the TLC block info table, the first table, and the second table are first written into the block of the NAND. The SLC block info table continues to record the mapping relationship JM L2P generated by writing the FTL mapping table, the trim table, the TLC block info table, the first table, and the second table into the block of the NAND. After all other metadata is saved into the block of the NAND, the SLC block info table is finally saved into the block of the NAND. However, in this case, the SLC block info table may not record the mapping relationship JM L2P generated by writing the SLC block info table itself into the block of the NAND.

In some embodiments of the present application, the method further comprises: in the process of powering down the SSD, during the process of saving the SLC block info table from the DDR into the block of the NAND, recording, through the super block in the DDR, a mapping relationship generated by saving the SLC block info table into the block of the NAND.

In some embodiments, since the SLC block info table may not record the mapping relationship JM L2P generated by writing the SLC block info table itself into the block of the NAND. Therefore, a super block in a non-metadata module DDR is used to record the mapping relationship JM L2P generated by saving the SLC block info table into the block of the NAND, so that information data in the SLC block info table may be corrected based on the data information recorded by the super block after the SSD is powered up.

In some embodiments of the present application, after the step of saving the SLC block info table from the DDR into the block of the NAND, the method further comprises: saving data information recorded in the super block of the DDR into the block of the NAND.

In some embodiments, after the super block in the non-metadata module DDR is used to record the mapping relationship JM L2P generated by saving the SLC block info table into the block of the NAND, the data information recorded in the super block of the DDR also needs to be saved into the block of the NAND, to prevent data loss in the DDR due to the powering down of the SSD.

In some embodiments of the present application, the step of saving data information recorded in the super block of the DDR into the block of the NAND comprises: saving, by a control manager, data information recorded in the super block of the DDR into the block of the NAND.

In some embodiments, a manner of saving the data information recorded in the super block of the DDR into the block of the NAND is implemented by the control manager.

In some embodiments of the present application, the method further comprises: in a process of powering up the SSD, restoring the data information stored in the block of the NAND and the SLC block info table into the DDR.

In some embodiments, in the process of powering down the SSD, the data information recorded in the super block of the DDR and the SLC block info table are saved through the block of the NAND. Therefore, in the process of powering up the SSD, the data information saved in the block of the NAND and the SLC block info table are restored into the DDR.

In some embodiments of the present application, the SLC block info table records a timestamp at which a block of a NAND is changed from a free block to an open block, and the step of querying a second physical address of an open block in an SLC block info table of the DDR includes: determining a block corresponding to a latest timestamp in the SLC block info table as the open block; and querying the second physical address of the open block.

In some embodiments, the sequence number in the SLC block info table records the timestamp at which a current SLC is selected from free blocks as an open block. It starts from 1 and increments sequentially by 1. The timestamp will not reverse throughout the entire lifespan of the SSD. Therefore, the open block may be determined based on a value of the timestamp, and the block corresponding to the maximum timestamp in the SLC block info table is determined as the open block. Therefore, the second physical address of the open block may be queried.

In some embodiments of the present application, the SLC block info table is used for recording a block type of a block of a NAND, an occupancy state of the block of the NAND, and physical address information including a page usage situation of the block of the NAND.

In some embodiments of the present application, after the step of replacing the second physical address of the open block in the SLC block info table with the first physical address, the method further includes: obtaining a block type corresponding to a block in the SLC block info table; and setting a management structure of the block based on the block type corresponding to the block.

In some embodiments, after the information in the SLC block info table is corrected, the block type corresponding to the block may be obtained from the SLC block info table, and then the management structure of the block may be set based on the block type corresponding to the block.

In order to better understand the embodiments in the present application, an explanation will be made below through an example.

1) Writing Sequence of Metadata in a Power-Down Process

The metadata is managed by a JM and mainly includes an FTL mapping table, a trim table, a TLC block info table, a first table, a second table, and an SLC block info, which are saved in an SLC manner. The FTL mapping table, the trim table, and the TLC block info table are referred to as external metadata, and the JM is only responsible for reading and saving them, instead of updating them. The first table, the second table, and the SLC block info are updated and maintained by the JM and belong to internal metadata of the JM.

The first table is a set of mapping relationships generated by writing the FTL mapping table, the trim table, the TLC block info table, and the like into an SLC block in an SLC manner, and is a linear table that uses a JM Logical Block Address (LBA) as an index and uses a physical address of the NAND address as content.

The second table is a set of mapping relationships generated by writing the first table into an SLC block in an SLC manner, and is also a linear table that uses the JM_LBA as an index and physical address of the NAND address as content.

During space allocation within an SSD's DDR, the first table is first allocated, and then the second table is allocated. The second table is adjacent to the first table.

A format of an SLC block info table is shown in FIG. 2, which shows a schematic diagram of an SLC block info table according to an embodiment of the present application.

The SLC block info table is a set that records SLC block info corresponding to all SLCs, and is aligned with an SLC page size. PCA in the SLC block info records address information of a current SLC block, and is a set of structural bit segments (The term "structural bit segments" refers to defining multiple members (variables) within a structure, each occupying a specific number of bits.). Referring to FIG. 3, a schematic diagram of a PCA according to an embodiment of the present application is shown.

Block type records the type of metadata stored in the current SLC, such as an SLC block type of an FTL mapping table type. If the SLC is a bad block, the block type is a bad block type. If SLC is empty, the block type is a free block type. Erase cnt records erase count of the current SLC, which is also an important indicator for the JM to implement wear leveling for all the SLCs; and sequence number records a timestamp at which the current SLC is selected from free blocks as an open block, starts from 1, and increments sequentially by 1. This value will not reverse throughout the entire lifespan of the SSD. This is also an important parameter for the JM to recycle an SLC and sequentially read the SLC block info table upon the SSD is powered up to construct SLC block management.

Figure 4:
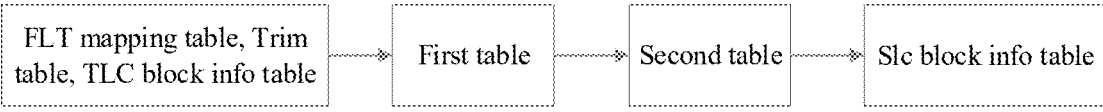
FIG. 4 is a schematic diagram of a writing sequence of metadata in a power-down process according to an embodiment of the present application.

A writing sequence of metadata in the power-down process is determined based on association of the metadata. FIG. 4 is a schematic diagram of a writing sequence of metadata in a power-down process according to an embodiment of the present application.

When the JM receives a power-down request that meets a power-down conditions, the JM first writes the FTL mapping table, the Trim table, and the TLC block info table, then writes the first table, then writes the second table, and finally writes the SLC block info table.

In order to ensure that the JM may exit the power-down process, JM L2Ps generated by sequentially writing the SLC block info table into SLC blocks according to SLC block page sizes are all saved into a super block region of a DDR. The super block region is saved into a NAND by a last processing module Control Manager (CM) in the power-down process. Before the SSD is powered up to load firmware and restore metadata, the CM will restore the super block region from the NAND into the super block region of the DDR.

2) Process of Recovering SLC Block Info and Reconstructing SLC Block Management Reconstruction After the SSD is powered down and then powered up again, the CM may first restore super block information from the NAND into the DDR, and the super block information includes JM l2p information corresponding to the SLC block info.

The process of restoring the SLC block info and reconstructing the SLC block management is as follows: The JM first reads the JM L2P recorded in the super block in sequence, and then reads the SLC blocks to restore the SLC block info into the DDR. After all the jm_l2ps are read and the recovery of the SLC block info is completed, the reconstruction process of an SLC block management structure begins. For an SLC block info type, a global variable powerDown_PCA (first physical address) is defined to store a last jm_l2p. In the reconstruction process, the JM sequentially reads each piece of SLC block info recorded in the SLC block info table and selects corresponding management structures based on block types recorded in the SLC block info. If the recorded block types are a non-free block type or a bad block type, sequence numbers recorded in the SLC block info are compared to determine whether a current SLC is added to a used block list in the management structure or maintained at an open block position. After all the pieces of SLC block info are read and reconstruction is completed, an SLC with a maximum sequence number stays at an open block position.

3) Process of Correcting an SLC Open Block of SLC Block Info

Figure 5:
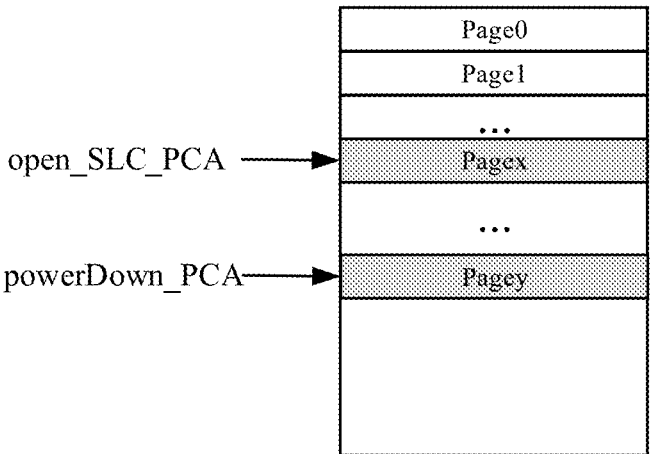
FIG. 5 is a schematic diagram of an SLC open block that is not switched according to an embodiment of the present application.

PCA corresponding to the SLC open block is obtained from a management structure corresponding to the SLC block info type, and is denoted as open_SLC_PCA (second physical address). After pages in open_SLC_PCA and powerDown_PCA are cleared, the following process is performed:

If open_SLC_PCA is the same as powerDown_PCA (referring to FIG. 5, which shows a schematic diagram of an SLC open block that is not switched according to an embodiment of the present application), it indicates that in the previous power-down process, the SLC block info is saved without switching the open block. In this case, only uncleared powerDown_PCA needs to be assigned to open_SLC_PCA in the SLC block info management structure, thus correcting page usage information in the open block.

Figure 6:
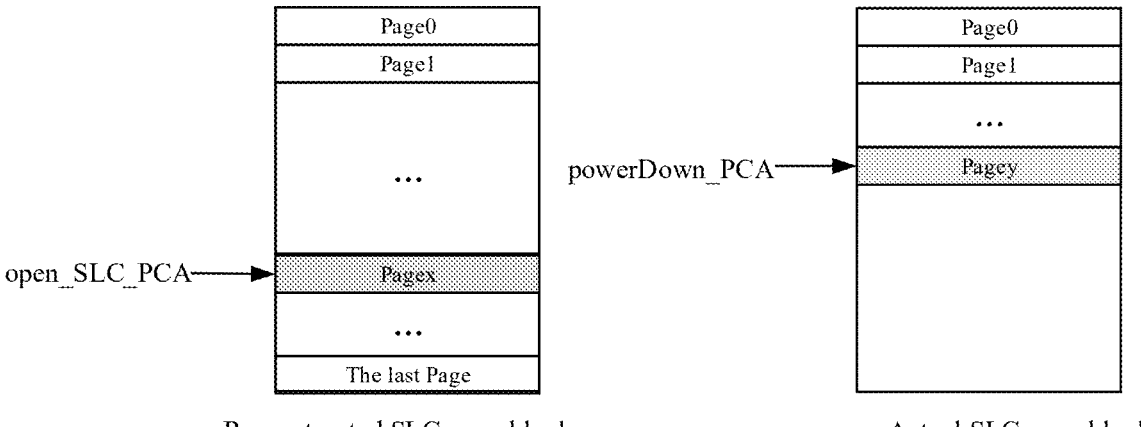
FIG. 6 is a schematic diagram of an SLC open block that has been switched according to an embodiment of the present application.

If open_SLC_PCA and powerDown_PCA are different (as shown in FIG. 6, which shows a schematic diagram of an SLC open block that has been switched according to an embodiment of the present application), it indicates that during saving of the SLC block info in the previous power-down process, the open block is fully written and a block switching process is executed. This process applied for a new free block as an open block of the SLC block info and saves the remaining SLC block info table. The above process causes a change in the SLC block info, but the JM does not write the latest SLC block info into the NAND when saving all the SLC block info. If the newly obtained SLC open block is located in the area of the SLC block info that has already been written to the NAND, the SLC corresponding to powerDown_SCA is still a free block in the SLC block info that is restored in the power-up process, which poses a risk that the SCL will be applied for as an open block by other metadata storage processes. In this case, uncleared powerDown_PCA needs to be assigned to open_SLC_PCA in the block info management structure; the block type in the corresponding SLC block info needs to be corrected from a free type into an SLC block info type; and the occupancy state in the corresponding free block management structure needs to be changed into an occupied state, so as to prevent the SLC from being applied for as a free block again. The above process corrects an SLC block info type open block.

In the above embodiments, the method for correcting an open block when the SSD is powered up effectively solves the problem that a change caused by a fact that the metadata may not be effectively written into an SLC block in the process of saving the SLC block info when the SSD is powered down leads to inconsistency between an open block used for saving the SLC block info and an open block reconstructed when the SSD is powered up, avoids a reading failure caused by repeated writing of a block and a final risk that the SSD may not be used normally, and improves stability and reliability of operation of an SSD system.

It shall be noted that, for the method embodiments, in order to simplify the description, they are all expressed as a combination of a series of actions. However, those skilled in the art shall be aware that the embodiments of the present application are not limited by the described order of actions. This is because, according to the embodiments of the present application, certain steps may be carried out in a different order or simultaneously. Secondly, those skilled in the art shall also be aware that the embodiments described in the specification are all preferred embodiments, and the actions involved are not necessarily required for the embodiments of the present application.

Figure 7:
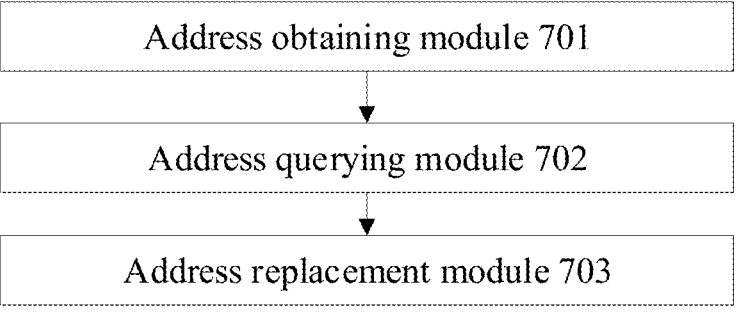
FIG. 7 is a structural block diagram of an apparatus for correcting a block of a solid-state drive according to an embodiment of the present application.

FIG. 7 is a structural block diagram of an apparatus for correcting a block of a solid-state drive according to an embodiment of the present application. The apparatus comprises:

an address obtaining module, configured to: after powering up the SSD, obtain a first physical address in a latest mapping relationship recorded by a super block of a DDR;

an address querying module, configured to query a second physical address of an open block in an SL block info table of the DDR; and an address replacement module, configured to: replace the second physical address of the open block in the SLC block info table with the first physical address.

In some embodiments of the present application, the first physical address comprises first page usage information of a first block corresponding to the first physical address, the second physical address comprises second page usage information of a second block corresponding to the second physical address. An address replacement module includes:

a block determining submodule, configured to determine whether the first block corresponding to the first physical address and the second block corresponding to the second physical address are identical; and a page usage information replacement submodule, configured to: in response to the first block corresponding to the first physical address and the second block corresponding to the second physical address being identical, replacing the second page usage information with the first page usage information.

In some embodiments, wherein in response to that the first block corresponding to the first physical address and the second block corresponding to the second physical address being identical represents that no new free block is used when the SLC block info table is saved from the DDR to a block of a non-volatile memory express (NAND) flash memory in a powering off process of the SSD.

In some embodiments of the present application, the apparatus further includes:

an address replacement submodule, configured to: in response to that the block corresponding to the first physical address and the block corresponding to the second physical address being different, replacing the second physical address corresponding to the open block in the SLC block info table with the first physical address.

In some embodiments of the present application, when the first block corresponding to the first physical address and the second block corresponding to the second physical address are different, in a process of powering down the SSD, a new free block is used when the SLC block info table is saved from the DDR to a block of a NAND.

In some embodiments of the present application, the apparatus further includes:

a state change submodule, configured to change an occupancy state of the second block corresponding to the second physical address from a free state to an occupied state.

In some embodiments of the present application, the apparatus further includes: a type change submodule, configured to change a block type of the second block corresponding to the second physical address from a free block type to an SLC block info type.

In this embodiment of the present application, the block determining submodule includes:

a page clearing unit, configured to clear the first page of the first physical address and the second page of the second physical address;

an address comparison unit, configured to determine whether the first physical address with a cleared page and the second physical address with a cleared page are consistent; a first block determining unit, configured to: in determining that the first physical address with the cleared page and the second physical address with the cleared page are consistent, determining that the first block corresponding to the first physical address and the second block corresponding to the second physical address are identical; and a second block determining unit, configured to: in determining that the first physical address with the cleared page and the second physical address with the cleared page are inconsistent, determining that the first block corresponding to the first physical address and the second block corresponding to the second physical address are different.

In some embodiments of the present application, the apparatus further includes: a data saving module, configured to: in a process of powering down the SSD, saving metadata stored in the DDR into a block of a NAND, wherein the metadata at least comprises a flash translation layer (FTL) mapping table, a trim table, a TLC block info table, a first table, a second table, and an SLC block info table.

In some embodiments of the present application, the data saving module includes:

a first data saving submodule, configured to: save the metadata into the block of the NAND based on a sequence of the FTL mapping table, the trim table, the TLC block info table, the first table, the second table, and the SLC block info table.

In some embodiments of the present application, the apparatus further includes:

a mapping relationship recording module, configured to: in the process of powering down the SSD, during the saving the SLC block info table from the DDR into the block of the NAND, recording a mapping relationship generated by saving the SLC block info table into the block of the NAND through the super block in the DDR.

In some embodiments of the present application, the apparatus further includes:

a second data saving module, configured to save data information recorded in the super block of the DDR into the block of the NAND.

In some embodiments of the present application, the second data saving module includes:

a second data saving submodule, configured to save, by a control manager, data information recorded in the super block of the DDR into the block of the NAND.

The second data saving module further includes:

a data recovery module, configured to: in a process of powering up the SSD, restore the data information stored in the block of the NAND and the SLC block info table into the DDR.

In some embodiments of the present application, the SLC block info table records a timestamp at which a block of a NAND is changed from a free block to an open block, and the address querying module includes:

an open block determining submodule, configured to determine a block corresponding to a latest timestamp in the SLC block info table as the open block; and an address querying submodule, configured to query the second physical address corresponding to the open block.

In some embodiments of the present application, the SLC block info table is used for recording a block type of a block of a NAND, an occupancy state of the block of the NAND, and physical address information including a page usage state of the block of the NAND.

In some embodiments of the present application, the apparatus further includes:

a type obtaining module, configured to obtain a block type corresponding to a block in the SLC block info table; and a structure setting module, configured to set a management structure of the block based on the block type corresponding to the block.

Since the apparatus embodiment is basically similar to the method embodiment, its descriptions are relatively simple, and related parts refer to some of the explanations of the method embodiment.

Additionally, the embodiments of the present application also provide an electronic device, which comprises: a processor, a memory, and a computer program stored on the memory and executable on the processor. When the computer program is executed by the processor, it implements the various processes of the solid-state drive (SSD) block correction method as described in the embodiments above and achieves the same technical effects. To avoid repetition, further details are omitted here.

The embodiments of the present application also provide a non-transitory computer readable storage medium, which stores a computer program. When the computer program is executed by a processor, it implements the various processes of the SSD block correction method as described in the embodiments above and achieves the same technical effects. To avoid repetition, further details are omitted here. The non-transitory computer readable storage medium may be a Read-Only Memory (ROM), Random Access Memory (RAM), magnetic disk, or optical disc, among others.

Figure 8:
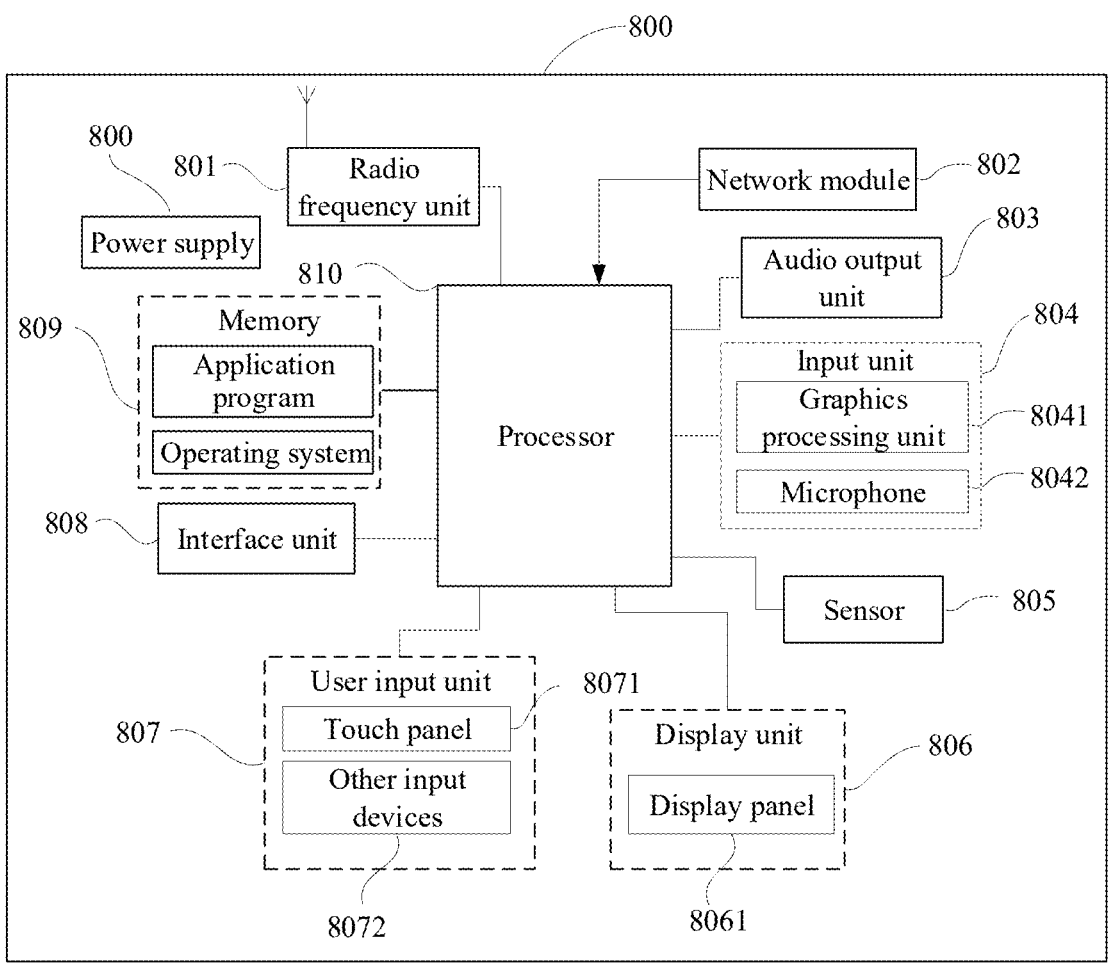
FIG. 8 is a structural block diagram of an electronic device according to an embodiment of the present application.

FIG. 8 illustrates the hardware structure of an electronic device for implementing the various embodiments of the present application.

The electronic device 800 comprises, but is not limited to: a radio frequency unit 801, a network module 802, an audio output unit 803, an input unit 804, a sensor 805, a display unit 806, a user input unit 807, an interface unit 808, a memory 809, a processor 810, and a power source 811, among other components. Those skilled in the art may understand that the structure of the electronic device shown in FIG. 8 does not limit the electronic device. The electronic device may include more or fewer components than shown in the figure, or certain components may be combined, or different component arrangements may be used. In the embodiments of the present application, the electronic device includes, but is not limited to, mobile phones, tablet computers, laptop computers, handheld computers, in-vehicle terminals, wearable devices, and pedometers.

It shall be understood that, in the embodiments of the present application, the radio frequency unit 801 may be used for receiving and transmitting information or signals during calls. In some embodiments, it receives downlink data from the base station and passes it to the processor 810 for processing. Additionally, it sends uplink data to the base station. Typically, the radio frequency unit 801 comprises, but is not limited to, an antenna, at least one amplifier, a transceiver, a coupler, a low-noise amplifier, and a duplexer. Moreover, the radio frequency unit 801 may also communicate with networks and other devices through a wireless communication system.

The electronic device provides wireless broadband internet access to users via the network module 802, such as helping users send and receive emails, browse web pages, and access streaming media.

The audio output unit 803 may convert audio data received by the radio frequency unit 801 or the network module 802, or stored in the memory 809, into audio signals and output them as sound. Moreover, the audio output unit 803 may also provide audio output related to specific functions performed by the electronic device 800 (e.g., the sound of an incoming call signal, the sound of an incoming message, etc.). The audio output unit 803 includes a speaker, a buzzer, and a receiver, among others.

The input unit 804 is used to receive audio or video signals. The input unit 804 may include a Graphics Processing Unit (GPU) 8041 and a microphone 8042. The GPU 8041 processes image data obtained by an image capture device (such as a camera) in video capture mode or image capture mode. The processed image frames may be displayed on the display unit 806. The processed image frames may also be stored in the memory 809 (or other storage media) or sent via the radio frequency unit 801 or the network module 802. The microphone 8042 may receive sound and process it into audio data. The processed audio data may be converted into a format suitable for transmission to a mobile communication base station via the radio frequency unit 801 in telephone call mode.

The electronic device 800 also comprises at least one sensor 805, such as a light sensor, motion sensor, and other sensors. In some embodiments, the light sensor includes an ambient light sensor and a proximity sensor. The ambient light sensor may adjust the brightness of the display panel 8061 based on the ambient light conditions. The proximity sensor may turn off the display panel 8061 and/or backlight when the electronic device 800 is brought to the ear. As a type of motion sensor, the accelerometer may detect the magnitude of acceleration in various directions (typically three axes). When stationary, it may detect the magnitude and direction of gravity and may be used to identify the device's orientation (e.g., screen rotation, related games, magnetometer calibration), vibration recognition functions (e.g., pedometer, tapping), and more. The sensor 805 may also include a fingerprint sensor, pressure sensor, iris sensor, molecular sensor, gyroscope, barometer, hygrometer, thermometer, infrared sensor, and more, which are not further detailed here.

The display unit 806 is used to display information input by the user or provided to the user. The display unit 806 may comprise a display panel 8061, which may be configured in the form of a Liquid Crystal Display (LCD), Organic Light-Emitting Diode (OLED), or other forms.

The user input unit 807 may be used to receive input of numerical or character information and to generate key signal inputs related to user settings and functional controls of the electronic device. In some embodiments, the user input unit 807 includes a touch panel 8071 and other input devices 8072. The touch panel 8071, also known as a touchscreen, may collect user touch operations (e.g., using fingers, styluses, or any suitable objects or accessories on or near the touch panel 8071). The touch panel 8071 may comprise a touch detection device and a touch controller. The touch detection device detects the user's touch position and the signals generated by the touch operation, transmitting the signals to the touch controller. The touch controller receives the touch information from the touch detection device, converts it into touch coordinates, and sends it to the processor 810, which executes commands received from the processor 810. The touch panel 8071 may be implemented in various types, including resistive, capacitive, infrared, and surface acoustic wave technologies. In addition to the touch panel 8071, the user input unit 807 may also comprise other input devices 8072, such as a physical keyboard, function keys (e.g., volume control keys, power keys), trackball, mouse, joystick, and more, which are not further detailed here.

Furthermore, the touch panel 8071 may be overlaid on the display panel 8061. When the touch panel 8071 detects a touch operation on or near it, it sends the information to the processor 810 to determine the type of touch event. Subsequently, the processor 810 provides corresponding visual output on the display panel 8061 based on the type of touch event. Although in FIG. 8, the touch panel 8071 and the display panel 8061 are shown as two separate components for input and output functions of the electronic device, in some embodiments, the touch panel 8071 and the display panel 8061 may be integrated to achieve the input and output functions of the electronic device. Specific limitations are not provided here.

The interface unit 808 serves as an interface for connecting external devices to the electronic device 800. For example, external devices may comprise wired or wireless headphone jacks, external power (or battery charger) ports, wired or wireless data ports, storage card ports, ports for connecting devices with identification modules, audio input/output (I/O) ports, video I/O ports, headphone jacks, and more. The interface unit 808 may be used to receive inputs from external devices (e.g., information parameters, power, etc.) and transmit the received inputs to one or more components within the electronic device 800 or to transfer data between the electronic device 800 and external devices.

The memory 809 may be used to store software programs and various data. The memory 809 mainly includes a program storage area and a data storage area. The program storage area may store operating systems, applications required for at least one function (e.g., audio playback, image playback, etc.), and more. The data storage area may store data created based on the use of the device (e.g., audio data, phone book, etc.). Additionally, the memory 809 may comprise high-speed random access memory and non-transitory memory, such as at least one magnetic disk storage device, flash memory device, or other volatile solid-state storage devices.

The processor 810 is the control center of the electronic device, connecting various parts of the electronic device through various interfaces and lines. By running or executing software programs and/or modules stored in the memory 809 and calling data stored in the memory 809, the processor 810 performs various functions of the electronic device and processes data, thereby monitoring the entire device. The processor 810 may comprise one or more processing units. Preferably, the processor 810 may integrate an application processor and a modem processor. The application processor mainly handles the operating system, user interface, and applications, while the modem processor mainly handles wireless communication. It shall be understood that the aforementioned modem processor may also not be integrated into the processor 810.

The electronic device 800 may also comprise a power source 811 (e.g., a battery) that supplies power to various components. Preferably, the power source 811 may be logically connected to the processor 810 through a power management system, thereby enabling the power management system to manage charging, discharging, and power consumption management functions.

Additionally, the electronic device 800 includes some functional modules not shown in the figure, which are not further detailed here.

Figure 9:
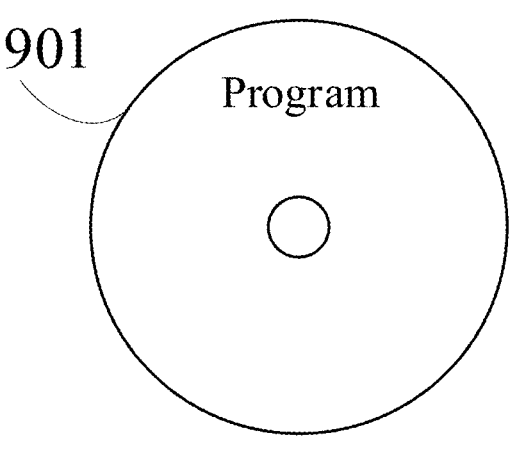
FIG. 9 is a block diagram of a non-transitory computer readable storage medium according to an embodiment of the present application.

The embodiments of the present application also provide a non-transitory computer readable storage medium, as shown in FIG. 9. The non-transitory computer readable storage medium stores a computer program 901. When the computer program 901 is executed by a processor, it implements the various processes of the SSD block correction method as described in the embodiments above and achieves the same technical effects. To avoid repetition, further details are omitted here. The non-transitory computer readable storage medium may be a Read-Only Memory (ROM), Random Access Memory (RAM), magnetic disk, optical disc, or other media.

It shall be noted that, in this text, the terms "including," "comprising," or any other variants are intended to cover non-exclusive inclusions. Thus, a process, method, item, or device that includes a series of elements not only includes those elements but also includes other elements not explicitly listed, or elements inherent to such process, method, item, or device. In the absence of more restrictive language, an element defined by the phrase "including a . . . " does not preclude the presence of additional identical elements in the process, method, item, or device that includes the element.

Through the above description of the implementation methods, those skilled in the art may clearly understand that the methods described in the embodiments above may be implemented using software in conjunction with a necessary general-purpose hardware platform. Of course, they may also be implemented using hardware, but in many cases, the former is a more preferable implementation method. Based on this understanding, the technical solutions of the present application, essentially or the parts that contribute to the existing technology, may be embodied in the form of a software product. The computer software product is stored in a storage medium (such as ROM/RAM, magnetic disk, optical disc), including several instructions to enable a terminal device (which may be a mobile phone, computer, server, air conditioner, or network device, etc.) to execute the methods described in the various embodiments of the present application.

The above description combines the accompanying drawings to describe the embodiments of the present application. However, the present application is not limited to the specific implementation methods described above. Under the inspiration of the present application, those skilled in the art may make many forms within the scope of the present application without departing from the purpose and scope of the present application.

It shall be noted that the various units and algorithm steps described in the embodiments of the present application may be implemented in electronic hardware, or in a combination of computer software and electronic hardware. These functions may ultimately be implemented in hardware or software depending on the specific application and design constraints. Skilled artisans may implement the described functions in different ways for each particular application, but such implementation shall not be considered to be beyond the scope of the present application.

Those skilled in the art may clearly understand that, for the convenience of description and conciseness, the specific working processes of the systems, devices, and units described above may refer to the corresponding processes in the method embodiments described earlier, and are not further detailed here.

In the embodiments provided by the present application, it shall be understood that the division of the units described above is merely a logical functional division. In actual implementation, there may be other division methods. For example, multiple units or components may be combined or integrated into another system, or some features may be ignored or not executed. Another point is that the display or discussion of the coupling or direct coupling or communication connection between the units may be through some interfaces, devices, or units, and may be in the form of electrical, mechanical, or other forms.

The units described as separate components may or may not be physically separate. The components displayed as units may or may not be physical units; they may be located in one place or distributed across multiple network units. The selection of some or all of these units may be made based on actual needs to achieve the objectives of the present embodiment.

Additionally, in the various embodiments of the present application, the functional units may be integrated into a single processing unit, exist separately as physical units, or two or more units may be integrated into one unit.

If the functions are implemented in the form of software functional units and sold or used as independent products, they may be stored in a non-volatile readable storage medium. Based on this understanding, the technical solution of the present application, or the part that makes a contribution to the existing technology, or a part of the technical solution, may be embodied in the form of a software product. This computer software product is stored in a storage medium and includes several instructions to enable a computer device (which may be a personal computer, server, or network device, etc.) to execute all or part of the steps of the methods described in the various embodiments of the present application. The aforementioned storage media include: USB drives, mobile hard disks, ROM, RAM, magnetic disks, optical discs, and various other media that may store program code.

The above description is merely a specific implementation method of the present application. However, the scope of protection of the present application is not limited to this. Any changes or substitutions that may be easily conceived by those skilled in the art within the technical scope disclosed by the present application shall be covered within the scope of protection of the present application. Therefore, the scope of protection of the present application shall be determined based on the appended claims.

The invention claimed is:

1. A method for correcting a block of a solid-state drive, comprising: after powering up the solid-state drive, obtaining a first physical address in a latest mapping relationship recorded by a super block of a double data rate (DDR);

querying a second physical address of an open block in a single layer cell (SLC) block info table of the DDR; and replacing the second physical address of the open block in the SLC block info table with the first physical address.

2. The method according to claim 1, wherein the first physical address comprises first page usage information of a first block corresponding to the first physical address, the second physical address comprises second page usage information of a second block corresponding to the second physical address, and the step of replacing the second physical address of the open block in the SLC block info table with the first physical address comprises:

determining whether the first block corresponding to the first physical address and the second block corresponding to the second physical address are identical; and in response to the first block corresponding to the first physical address and the second block corresponding to the second physical address being identical, replacing the second page usage information with the first page usage information.

3. The method according to claim 2, wherein in response to that the first block corresponding to the first physical address and the second block corresponding to the second physical address being identical represents that no new free block is used when the SLC block info table is saved from the DDR to a block of a non-volatile memory express (NAND) flash memory in a powering off process of the SSD.

4. The method according to claim 2, wherein, after the step of determining whether the first block corresponding to the first physical address and the second block corresponding to the second physical address are identical, the method further comprises:

in response to that the block corresponding to the first physical address and the block corresponding to the second physical address being different, replacing the second physical address corresponding to the open block in the SLC block info table with the first physical address.

5. The method according to claim 4, wherein when the first block corresponding to the first physical address and the second block corresponding to the second physical address are different, in a process of powering down the SSD, a new free block is used when the SLC block info table is saved from the DDR to a block of a NAND.

6. The method according to claim 4, wherein, after the step of determining that the first block corresponding to the first physical address and the second block corresponding to the second physical address are different, the method further comprises:

changing an occupancy state of the second block corresponding to the second physical address from a free state to an occupied state.

7. The method according to claim 4, wherein, after the step of determining that the first block corresponding to the first physical address and the second block corresponding to the second physical address are different, the method further comprises:

changing a block type of the second block corresponding to the second physical address from a free block type to an SLC block info type.

8. The method according to claim 7, wherein the SLC block info table is used for recording a block type of a block of a NAND, an occupancy state of the block of the NAND, and physical address information comprising a page usage state of the block of the NAND.

9. The method according to claim 8, wherein after the step of replacing the second physical address corresponding to the open block in the SLC block info table with the first physical address, the method further comprises:

obtaining a block type corresponding to a block in the SLC block info table; and setting a management structure of the block based on the block type corresponding to the block.

10. The method according to claim 2, wherein the step of determining whether the first block corresponding to the first physical address and the second block corresponding to the second physical address are identical comprises:

clearing a page of the first physical address and a page of the second physical address;

determining whether the first physical address with a cleared page and the second physical address with a cleared page are consistent;

in determining that the first physical address with the cleared page and the second physical address with the cleared page are consistent, determining that the first block corresponding to the first physical address and the second block corresponding to the second physical address are identical; and in determining that the first physical address with the cleared page and the second physical address with the cleared page are inconsistent, determining that the first block corresponding to the first physical address and the second block corresponding to the second physical address are different.

11. The method according to claim 1, further comprising:

in a process of powering down the SSD, saving metadata stored in the DDR into a block of a NAND, wherein the metadata at least comprises a flash translation layer (FTL) mapping table, a trim table, a TLC block info table, a first table, a second table, and an SLC block info table.

12. The method according to claim 11, wherein the step of saving metadata stored in the DDR into a block of a NAND comprises:

saving the metadata into the block of the NAND based on a sequence of the FTL mapping table, the trim table, the TLC block info table, the first table, the second table, and the SLC block info table.

13. The method according to claim 11, further comprising:

in the process of powering down the SSD, during the saving the SLC block info table from the DDR into the block of the NAND, recording a mapping relationship generated by saving the SLC block info table into the block of the NAND through the super block in the DDR.

14. The method according to claim 13, after the step of saving the SLC block info table from the DDR into the block of the NAND, the method further comprises:

saving data information recorded in the super block of the DDR into the block of the NAND.

15. The method according to claim 14, wherein the step of saving data information recorded in the super block of the DDR into the block of the NAND comprises:

saving, by a control manager, data information recorded in the super block of the DDR into the block of the NAND.

16. The method according to claim 14, further comprising:

in a process of powering up the SSD, restoring the data information stored in the block of the NAND and the SLC block info table into the DDR.

17. The method according to claim 1, wherein the SLC block info table records a timestamp at which a block of a NAND is changed from a free block to an open block, and the step of querying a second physical address corresponding to an open block in an SLC block info table of the DDR comprises:

determining a block corresponding to a latest timestamp in the SLC block info table as the open block; and querying the second physical address corresponding to the open block.

18. An electronic device, comprising: a processor, a communication interface, a memory, and a communication bus, wherein the processor, the communication interface, and the memory communicate with each other through the communication bus;

the memory is configured to store a computer program; and the processor is configured to execute the computer program stored on the memory to implement the method according to claim 1.

19. The electronic device according to claim 18, wherein the first physical address comprises first page usage information of a first block corresponding to the first physical address, the second physical address comprises second page usage information of a second block corresponding to the second physical address, and the step of replacing the second physical address of the open block in the SLC block info table with the first physical address comprises:

determining whether the first block corresponding to the first physical address and the second block corresponding to the second physical address are identical; and in response to the first block corresponding to the first physical address and the second block corresponding to the second physical address being identical, replacing the second page usage information with the first page usage information.

20. A non-transitory computer readable storage medium, having an instruction stored thereon, wherein the instruction, when executed by one or more processors, causes the processor to implement the method according to claim 1.

* * * * *